FIP8102 XR 3,293,550
CROSS REFERENCE SEARCH ROOM
Dec. 20, 1966 C. R. HOGGE, JR 3,293,550
TRANSMIT MONITOR
Filed July 23, 1963
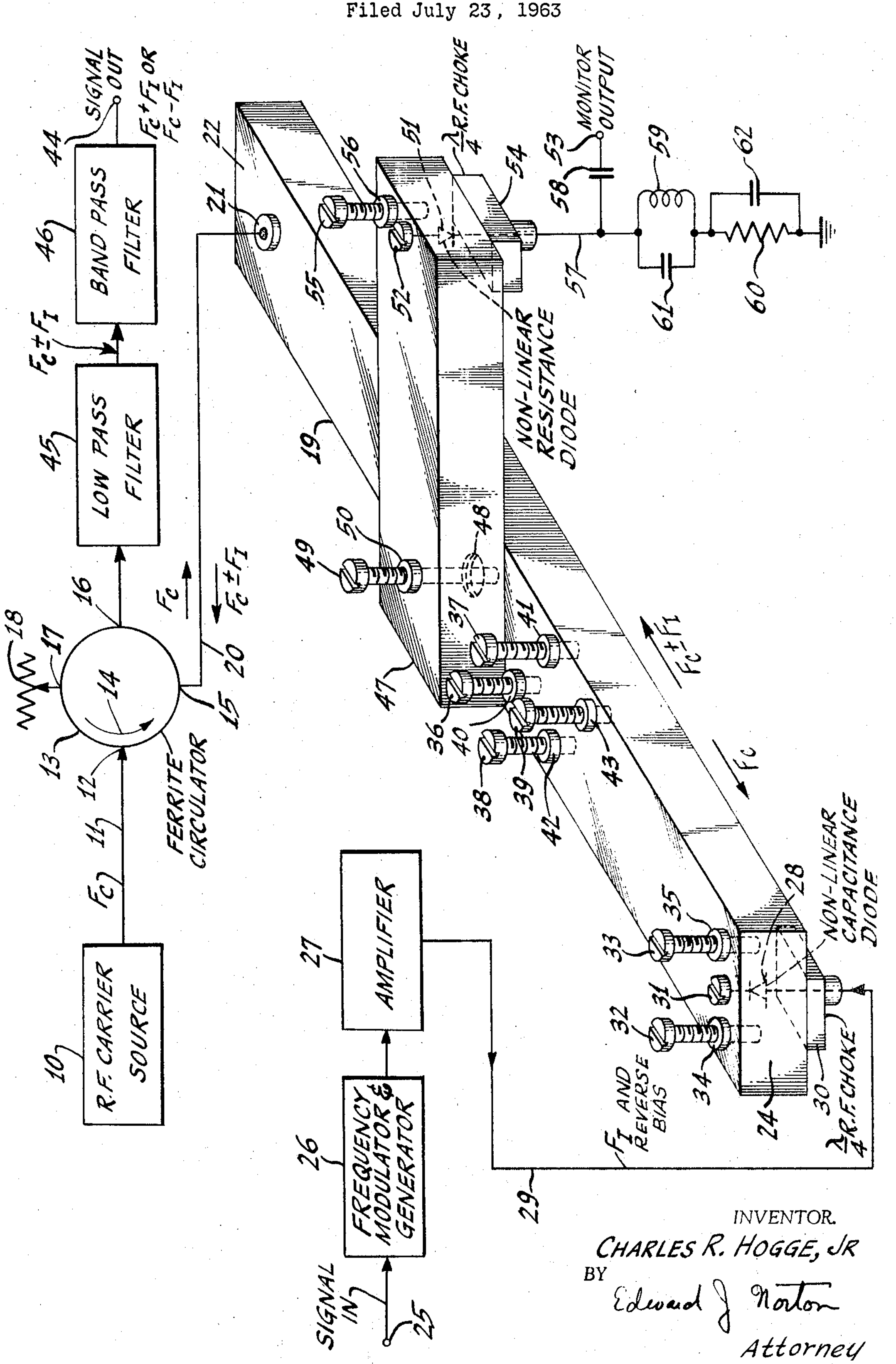
INVENTOR.
CHARLES R. HOGGE, JR
BY
Edward J Norton
Attorney United States Patent Office 3,293,550

Patented Dec. 20, 1966

3,293,550
TRANSMIT MONITOR

Charles R. Hogge, Jr., Cherry Hill, N.J., assignor to Radio Corporation of America, a corporation of Delaware Filed July 23, 1963, Ser. No. 297,038
15 Claims. (Cl. 325—133)

This invention relates to transmitters of the type used in radio frequency communication systems, and, particularly, to an improved arrangement for monitoring the performance of a transmitter used in such a system.

In order to ensure the proper operation of a signal transmitter, it is customary to provide some form of monitoring arrangement for determining the characteristics of the transmitted signal. It is common practice to couple a detector or similar means to the filtered output of the transmitter with the detector being arranged to produce a direct current which is indicative of the transmitter output power level. A disadvantage in the use of such a detector is the fact that it acts as a drain on the available output power from the transmitter.

In applications where the available transmitter output power level is not high, as in the case of recently developed transmitters using solid state devices such as transistors throughout, for example, this drain on the available output power is an important design consideration. If a loose coupling is used in an effort to minimize the drain on the output power level, resulting in the production of a low level direct current signal, the problems normally involved in the amplification of a low level direct current signal are encountered.

Where the quality of the intelligence carried by the transmitted signal must be analyzed in order to align the transmitter or perform other control functions, it has been the practice to provide suitable demodulating means arranged to recover the intelligence from the filtered output of the transmitter. A disadvantage in the use of such a demodulating means, where frequency conversion and IF amplification are not employed, is the fact that it also acts as a drain on the available output power from the transmitter. If frequency conversion and IF amplification are employed in the demodulating means in an effort to minimize the drain on the output power level, a source of radio frequency power is required as a local oscillator for the frequency conversion.

The use of a monitoring arrangement in which signal demodulating means and/or a power level detector are made responsive to the filtered output of a transmitter adds a number of circuit components in the output stage of the transmitter. Since in a typical application the output stage of the transmitter already includes a branching network consisting of a complex radio frequency waveguide or other assembly, the additional components and connections to include the monitoring arrangement in the output stage greatly increases the electrical and mechanical complexities involved in the design and construction of the output stage. The cost and size of the output stage can be greatly increased by the added components.

Also, the output stage can include means for switching the output load of the transmitter. Means can be provided for selectively connecting an antenna assembly or other radio communication path to the transmitter. In such a case, the proximity of the monitoring arrangement to the switching means in the output stage results in the monitoring arrangement being receptive to transients, interruptions and other adverse affects introduced by the switching means.

It is an object of the invention to provide an improved arrangement for monitoring the performance of a signal transmitter.

Another object is to provide for use with a signal transmitter an improved arrangement for monitoring the output signal of the transmitter so that a reduced loss of the transmitter output power occurs.

A further object is to provide for use with a signal transmitter an improved output signal monitoring arrangement which is electrically and physically isolated from the output load of the transmitter.

A still further object is to provide for use with a signal transmitter an improved output signal monitoring arrangement located in the transmitter in such a way as to add only a small amount of equipment and complexity in the operation and construction of the transmitter.

Briefly, in the embodiment of the invention described herein, a unidirectional wave transmitting device such as a ferrite circulator is utilized to couple a radio frequency (RF) carrier signal into one end of a waveguide. A signal of an intermediate frequency (IF), frequency-modulated by the intelligence to be transmitted, is fed to one end of a non-linear capacitance diode which is coupled to the maximum electric field at the opposite end of the waveguide. The other end of the diode is grounded to a wall of the waveguide. A sideband signal composed of frequency modulated sidebands having frequencies spaced on either side of the carrier frequency by the IF frequency is produced within the waveguide by the interaction of signal energy across the diode. The sideband signal is coupled from the one end of the waveguide back through the unidirectional wave transmitting device to a filtering arrangement. The filtering arrangement serves to select the particular frequency modulated sideband frequency desired for the transmitted signal which is then available for transmission over a suitable communication path.

A monitor waveguide is positioned between the ends of the waveguide. A loose coupling is provided for transferring small amounts of the RF carrier signal and of the sideband signal from the first waveguide into the monitor waveguide. A non-linear resistance or mixer diode contained in the monitor waveguide is responsive to the RF carrier signal and to the sideband signal to produce a frequency modulated monitor output signal having the frequency of the original IF signal.

The level of the monitor output signal is proportional to the transmitted sideband signal level and indicates the failure of either the RF carrier signal or the IF signal. Since the monitor output signal is an alternating current signal rather than direct current, it can be readily amplified to a higher level and detected. It is necessary to couple only a small amount of the sideband signal power into the monitor waveguide, thus minimizing the loss of transmitter output power. The location of the monitor assembly in the form of the monitor waveguide provides isolation between the transmitter output load and the monitor coupling to the transmitter, permitting the transmitter output load to be switched or otherwise acted upon without affecting the monitor output signal.

A more detailed description of the invention will now be given in connection with the single figure of the drawing which is partly a perspective view and partly a block diagram of one embodiment of a transmit monitor constructed according to the invention.

A radio frequency carrier source 10 is shown in the drawing. The source 10, which may be of any suitable known construction, includes an oscillator. Frequency multiplication and amplification means can also be included in the source 10 for providing a carrier signal of frequency $F_c$ having the desired radio frequency and power level. By way of example, it is assumed that the source 10 is arranged to provide a carrier signal having a frequency $F_c$ of 6000 mc. (megacycles).

The carrier signal is applied over a coaxial or other suitable connector 11 to one port 12 of a four port unidirectional wave transmitting device shown as a ferrite circulator 13. The circulator 13 is a nonreciprocal device which is constructed to transmit wave energy incident on one port to only the next successive port, in the direction of the arrow 14 shown in the drawing. Thus, for example, wave energy incident on the port 12 is forwarded only to the second port 15. Wave energy received at the second port 15 from external circuits connected thereto is forwarded only to the third port 16. Similarly, any wave energy received at the third port 16 from external circuits connected thereto is forwarded only to the fourth port 17 where a matched terminating resistor 18 is connected. The matched terminating resistor 18 prevents energy from being reflected back to the first port 12. This coupling of wave energy only to a next successive port is contrary to the normal bilateral mode of operation expected of passive elements and is obtained by the use of magnetized bimetallic ferrites in such devices. The circulator 13 may, for example, be constructed in the manner of one identified as Model T–453 LA and manufactured by Ferrotec Inc., Newton, Mass. A description of the operation and construction of circulators is found in an article "The Elements of Nonreciprocal Microwave Devices," Proceedings of the IRE, October 1956, page 1345.

The carrier signal of frequency $F_c$ incident on the first port 12 of the circulator 13 is fed from the second port 15 to one end of a waveguide structure 19 via a coaxial connector 20 and a coaxial-to-waveguide transducer 21. The transducer 21 which may be of any known construction and which may include, for example, a capacitive probe coupling positioned substantially one-quarter wavelength at the frequency band of interest from the end plate 22 of the waveguide 19. The waveguide 19 may be of the type defined as RG 50/U rectangular waveguide and can be constructed of brass which is silver plated internally of the waveguide. Based on the assumed carrier frequency $F_c$ of 6000 mc., the waveguide 19 is proportioned to support wave energy in the frequency band 5000 to 8000 mc. By way of example, the waveguide 19 can be approximately eight inches long, one and one-half inches wide and three-quarters of an inch deep.

A signal to be transmitted is applied to the input terminal 25. The signal may be a voice signal, a television signal, some form of pulse multiplex signal or any other signal capable of being transmitted over a communication path. The received signal is fed from the input terminal 25 to a frequency modulator 26. The frequency modulator 26 which includes an oscillation generator and which may be of conventional construction converts the received signal into a frequency modulated signal of intermediate frequency $F_I$, for example, 70 mc., and defined herein as the intermediate frequency (IF) signal. The IF signal of frequency $F_I$ is amplified by an amplifier 27, and is fed along with a direct current negative voltage, reverse bias to the anode of a non-linear capacitance diode 28 spaced from the end plate 24 of the waveguide 19 over an electrical path including a coaxial or other suitable connector 29 and a quarter wavelength RF choke 30. The choke 30 serves to block wave energy at or about a frequency of 6000 mc. present in the waveguide 19 from being fed back over the connector 29 to the amplifier 27. The diode 28 can be of the type constructed as a cartridge which is screwed into the waveguide 19 by suitable mounting means 31 on the waveguide wall, resulting in the diode 28 itself being positioned at substantially the center of the internal area of the waveguide 19 and coupled to the maximum electric field in the waveguide 19 with the cathode of the diode 28 firmly grounded to the waveguide wall.

The diode 28 is of the type formed by the junction of two dissimilar semiconductors. Such a diode is formed of a layer of one type of semiconductor diffused into a wafer of another type of semiconductor and mounted with low resistance connections. If such a diode is biased in the reverse (non-conducting) direction, the mobile charge carriers are moved away from the junction, leaving uncompensated fixed charges in a region near the junction. The width, and hence, the electrical charge of this region (space-charge layer) depends on the applied voltage, giving rise to a junction transition capacitance. The junction diode transition capacitance is inversely proportional to the effective width of the junction, and, since the effective junction width is voltage dependent, the capacitance afforded by the junction diode is voltage dependent. In other words, a semiconductor junction when biased in the reverse or non-conduction direction is a capacitance which can be varied by varying the bias voltage. The diode 28 may be, for example, of the type defined as having a capacitance in the range of .50 to .90 micromicrofarad when reversed biased at −6 volts. The diode 28 may be a gallium arsenide varactor diode constructed in the manner of that identified as Type VD313 and manufactured by the Radio Corporation of America.

A pair of adjustable tuning screws 32, 33 are positioned at opposite sides of the diode mount 31 by suitable mounting means 34 and 35, respectively, on the waveguide wall. Four additional, adjustable tuning screws 36, 37, 38 and 39 are positioned centrally in a staggered relationship (in the interest of conserving space) on the same waveguide wall by suitable mounting means 40, 41, 42 and 43, respectively.

A sideband signal including frequencies $F_c \pm F_I$ resulting from the interaction of the RF carrier signal of frequency $F_c$ and the IF signal of frequency $F_I$ across the diode 28 in a manner to be described is fed from the waveguide 19 to the second port 15 of the circulator 13 via the coaxial-to-waveguide transducer 21 and the connector 20. The sideband signal including the frequencies $F_c \pm F_I$ incident upon the second port 15 is fed to the third port 16 of the circulator 13 and from there to an output terminal 44 over an electrical path including a low pass filter 45 and a band pass filter 46.

A second, rectangular waveguide structure in the form of a monitor waveguide arm 47 is secured at one of its wider side walls to a corresponding wider side wall of the waveguide 19 by brazing or other known technique. The longitudinal axis of the waveguide 47 is shown as extending at substantially right angles to the longitudinal axis of the waveguide 19 with one end of the monitor waveguide 47 extending beyond the edge of the waveguide 19. The monitor waveguide 47 is of the construction similar to that of the waveguide 19, and can be constructed of a RG 50/U rectangular waveguide made of brass with the inner surface of the waveguide walls being silver plated. By way of example, the monitor waveguide 47 can be approximately two and three-quarters of an inch long, one and one-half inches wide, and three-quarters of an inch deep.

An annular slot or aperture 48 is cut through the adjoining walls of the two waveguides 19 and 47. An adjustable coupling screw 49 is positioned by a mounting means 50 on the wall of the monitor waveguide 47 to extend through the waveguide 47 and then through the slot 48 into the waveguide 19 for a short distance. The monitor waveguide 47 is dimensioned and the slot 48 is positioned so that the coupling screw 49 is coupled to the maximum electric field in the waveguide 19 and to the maximum electric field in the monitor waveguide 47, resulting in the transfer of wave energy from the waveguide 19 and into the waveguide 47. The power level of the energy so transferred is a function of the amount by which the coupling screw 49 penetrates into the waveguide 19.

A non-linear resistance or mixer diode 51 is positioned at the end of the monitor waveguide 47 opposite to that at which the coupling screw 49 is located. The polarity of the mixer diode 51 is unimportant. The mixer diode 51 may be constructed as a cartridge which is screwed into a wall of the monitor waveguide 47 by a suitable mounting means 52. The diode 51 is positioned so as to be coupled substantially to the maximum electric field in the monitor waveguide 47. One end of the mixer diode 51 is grounded through the diode cartridge or casing and the diode mount 52 to the waveguide wall. A coaxial or other connection 57 is completed from the opposite end of the mixer diode 51 to a monitor output signal terminal 53 via a quarter wavelength RF choke 54 and capacitor 58. The choke 54 may be of the same general construction as the choke 30 and serves to prevent energy at or about a frequency of 6000 mc. present in the monitor waveguide 47 from appearing at the monitor output signal terminal 53. An adjustable tuning screw 55 is positioned by a suitable mounting means 56 on the waveguide wall next to the mixer diode mount 52.

The non-linear resistance mixer diode 51 depends on a direct current to bias the diode 51 to a region of non-linearity on its current versus voltage characteristic. As is usually the case in the operation of such diode mixers, the direct current bias is established entirely by rectification of the radio frequencies applied to the diode 51. A direct current path between the diode 51 and a point of reference potential is provided including connection 57, an inductor 59, and a resistor 60. A capacitor 61 is coupled across inductor 59 to form a parallel resonant circuit tuned to the monitor signal frequency equal to the frequency of the original, first IF signal, assumed to be 70 mc. The parallel resonant circuit serves to develop the output signal coupled by capacitor 58 to terminal 53 at the frequency $F_I$, and to eliminate harmonics of the monitor output frequency. A capacitor 62 serves to bypass the bias resistor 60 at the monitor output frequency $F_I$.

All ground connections and common return paths between the blocks and waveguide structure described are omitted in order to simplify the drawing. Such connections are supplied in the customary manner.

In the operation of the embodiment shown in the single figure of the drawing, the 6000 mc. carrier signal at $F_c$=6,000 mc. supplied by the carrier source 10 is fed to the first port 12 of the circulator 13 via connector 11. The carrier signal at frequency $F_c$ is then fed from the second port 15 of the circulator 13 to the waveguide 19 via connector 20 and the coaxial-to-waveguide transducer 21. The carrier signal at frequency $F_c$ travels down the length of the waveguide 19 to the non-linear capacitance diode 28. The signal intelligence to be transmitted is fed through the frequency modulator 26 and amplifier 27 and is applied as a frequency modulated 70 mc. signal to the anode of the diode 28. The pass band is flat for the IF signal frequency $F_I$ and its sideband frequencies. A direct current negative voltage reverse bias, for example, −6 volts, is also applied to the diode 28 along with the IF signal at frequency $F_I$ so as to reverse bias the diode 28 in its non-conducting condition. The carrier signal $F_c$ and the IF signal at frequency $F_I$ are therefore present across the diode 28.

The non-linear capacitance diode 28 is believed to operate in the following manner. When the IF signal at frequency $F_I$ becomes positive-going, reducing the reverse bias applied to the diode 28, the capacitance presented by the diode 28 increases a corresponding amount. The diode structure is coupled across the waveguide 19 and looks like an inductive post to the wave energy present in the waveguide 19. This inductive post is parallel resonated by the capacitive tuning screws 32, 33. The carrier signal at frequency $F_c$ passes through the parallel resonant circuit with minimum attenuation and is reflected from the end plate 24, establishing a first phase reference. When the IF signal at frequency $F_I$ becomes negative-going, increasing the reverse bias applied to the diode 28, the capacitance presented by the diode 28 decreases a corresponding amount. The low capacitance of the diode 28 becomes series resonant with the diode lead inductance to produce a short circuit for the carrier signal at frequency $F_c$ at the plane of the diode 28. The carrier signal at frequency $F_c$ is now reflected from the plane of the diode 28, establishing a second phase reference.

This mechanism serves to produce in the waveguide 19 a signal composed of frequency modulated sidebands spaced on either side of the carrier frequency $F_c$ by the frequency of the first IF signal. A signal including the sideband frequencies $F_c \pm F_I$ is produced which travels back along the waveguide 19 to the coaxial-to-waveguide transducer 21. Tuning screws 36, 37, 38 and 39 perform an impedance matching between the diode 28 and the waveguide 19. While four tuning screws 36, 37, 38 and 39 are shown spaced along the wall of the waveguide 19, a smaller or larger number can be used according to the needs of the particular application. The number used need only be that number sufficient to provide the proper impedance match between the diode 28 and the waveguide 19, and can be determined experimentally.

The sideband signal including the frequencies $F_c \pm F_I$ produced by the non-linear interaction of the carrier signal of frequency $F_c$ and the IF signal of frequency $F_I$ across the diode 28 is fed from the waveguide 19 to the second port 15 of the circulator 13 via the coaxial-to-waveguide transducer 21 and connector 20. Since the end plate 22 is spaced one-quarter of a wavelength at carrier frequency from the transducer 21 and with a bandwidth wide enough to include the sideband at $F_c \pm F_I$, substantially all of the sideband signal energy is coupled out of the waveguide 19 and fed to the second port 15 of the circulator 13. This sideband signal is then fed from the third port 16 of the circulator 13 to the low pass filter 45. The low pass filter 45 serves to remove second and higher harmonics and sidebands of the harmonics from the signal applied thereto. The output of the low pass filter 45 is fed to the band pass filter 46 tuned to the assigned transmit channel frequency so that the output from low pass filter 45 passes through the band pass filter 46 with minimum attenuation. All signals outside the pass band of the filter 46 are reflected back to the third port 16 of the circulator 13 and directed from the fourth port 17 to the matched terminating resistor 18 where they are absorbed.

In the example given, a frequency modulated transmit signal having an assigned frequency of either 5930 mc. or 6070 mc. corresponding to the frequencies $F_c+F_I$ or $F_c-F_I$ appears at the output terminal 44. The signal can be fed from the terminal 44 to the usual output stages for transmission over a communication path. The communication path may include a microwave radio relay link or other point-to-point communication system.

In order to monitor the performance of the terminal equipment described for generating the transmit signal, the coupling screw 49 is made to penetrate through the slot 48 and into the waveguide 19 a distance sufficient to cause small amounts of signal at carrier signal frequency $F_c$ and at the sideband frequencies including the frequencies $F_c \pm F_I$ present in the waveguide 19 to be coupled into the monitor waveguide 47. A mixing of the carrier frequency and the sideband frequencies takes place across the mixer diode 51. The mixer diode 51 is matched to the waveguide 47 by the tuning screw 55 to provide maximum output at the difference frequency corresponding to the frequency of the original IF signal of frequency $F_I$ or 70 mc. The 70 mc. monitor output signal is passed by the choke 54 and fed to the terminal 53 via the connector 57 and coupling capacitor 58.

The output signal appearing at the terminal 53 can be used to perform the usual monitoring functions. Since the level of the monitor output signal is proportional to that of the transmit signal, an indication of the transmitter power output level is available. The failure of either the carrier signal at $F_c$ or of the IF signal at $F_I$ is immediately indicated by the absence of a signal at the terminal 53.

Since the monitor output signal is an alternating current signal rather than direct current, it can be readily amplified to a higher level using straight-forward alternating current amplification techniques and then processed to provide either an indication of the transmit power output level or to recover the original signal intelligence. It is only necessary that enough of the carrier and sideband signals be coupled into the monitor waveguide 47 to permit the mixer diode 51 to complete the mixing action. This can be provided by a small penetration of the coupling screw 49 into the waveguide 19 (or loose coupling) even where the available transmit output power level is not large. A minimum amount of discontinuity is introduced in the waveguide 19 by the coupling screw 49. Since only a minimal amount of power need be extracted to complete the monitoring operation, there is a minimum loss of the transmitter output power.

By coupling the output signal monitor to the transmitter terminal equipment in the manner described, the monitoring arrangement is isolated from the output load connected to the signal output terminal 44. The output load can be switched or other action performed without affecting the monitor output signal or the operation of the monitoring arrangement. This feature is particularly significant where a television signal is to be transmitted. In such cases, it is the practice to carefully align the transmitter before it is placed on the air or, in other words, before the transmitter is connected to the communication path. Since the operation of the monitoring arrangement is substantially independent of and unaffected by the condition of the output load, the alignment of the transmitter can be completed while the transmitter is maintained at standby, ensuring its proper operation when the connection to a communication path is completed.

In monitoring arrangements where the monitor output signal is derived at radio frequency, precise and often costly radio receiving equipment must be provided for demodulating the output signal and/or otherwise processing the monitor output signal into a form suitable for use by the monitoring arrangement. The ability to derive the monitor output signal at intermediate frequency which can then be demodulated in the conventional manner eliminates the need for radio frequency signal processing circuits in the monitoring arrangement. A considerable saving in both the cost and complexity of the monitoring arrangement is possible.

The monitoring arrangement can include the usual equipment responsive to the monitor output signal at terminal 53. Alarms in the form of bells or lights, not shown, can be operated by the monitor output signal to provide a continuous indication of performance. Signal analyzers and other test equipment, not shown, can also be made responsive to the monitor output signal for aligning or otherwise determining the operation of the transmitter terminal equipment. Where the transmitter terminal equipment forms part of a microwave radio relay system, the monitor output signal terminal 53 can be connected to a fault alarm system operated in conjunction with the relay system.

In describing the embodiment shown in the drawing, reference has been made to the use of a single slot 48 in the adjoining walls of the two waveguides 19 and 47 for coupling energy from the waveguide 19 and into the monitor waveguide 47. Since a certain amount of the carrier signal of frequency $F_c$ will be reflected back along the waveguide 19, a standing wave at the carrier signal frequency exists in the waveguide 19. The slot 48 should be positioned so that the coupling screw 49 aligned with the slot 48 is near the point of voltage maximum of the standing wave rather than at a voltage minimum or trough of the standing wave. In order to provide some freedom of design, an additional slot, not shown, can be cut through the adjoining walls of the waveguides 19 and 47 with the additional slot being spaced from the slot 48 along the longitudinal axis of the waveguide 19. A further mounting means similar to the mounting means 50 is provided on the wall of the waveguide 47 for aligning a coupling screw with the additional slot. The coupling screw 49 can then be inserted through first one and then the other of the slots to determine which one of the positions provides the maximum coupling ensuring the most efficient operation possible. A tuning screw can be used to fill the mounting means not used by the coupling screw 49. Note that although two slots can be provided, only a single coupling screw 49 is used.

In applications where the circulator 13 is one which provides waveguide input-output connections rather than coaxial connections, the connector 20 can be made of a suitable waveguide section. The coaxial-to-waveguide transducer 21 becomes a waveguide-to-waveguide transition of known construction.

While reference has been made to particular frequencies in connection with the embodiment shown in the drawing, the invention is not limited thereto. The frequencies can be changed according to the needs of a particular application with the operation of the transmit monitor remaining as described.

In describing the embodiment shown in the drawing, reference is made to a variable capacitance diode frequency converting arrangement with a particular switching mode of operation. Actually, the transmit monitor provided by the invention can be used with any similar high level mixer or frequency converter that might use switching diodes, nonlinear resistance diodes or other means of generating sideband frequencies. It is only necessary that the coupling for the monitor mixer be located in a transmission medium that contains both the carrier and sideband frequencies with isolation being provided between the monitor and the output load of the transmitter.

What is claimed is:

1. An arrangement for monitoring the performance of a radio frequency transmitter comprising, in combination,
   - a source of a carrier signal of a first frequency,
   - a first non-linear frequency converter,
   - means for applying said carrier signal to said first converter,
   - a source of a modulating signal of a second frequency,
   - means for applying said modulating signal to said first converter in a manner to cause said first converter to modulate said carrier and produce a third signal composed of modulated sidebands spaced on either side of said first frequency by said second frequency,
   - first and second output terminals,
   - means coupled to said first converter and responsive to said third signal for applying a selected one of said sidebands to said first output terminal,
   - and a second nonlinear frequency converter coupled between said first converter and said second output terminal and responsive to said carrier signal and said third signal for mixing said carrier signal and said third signal and producing at said second output terminal a fourth difference frequency signal of a frequency equal to said second frequency.

2. In a transmitter,
   - a multiport circulator device of the type arranged to pass signal energy incident on one of said ports only to the next successive one of said ports,
   - a first non-linear frequency converter,
   - means for applying a carrier signal of a first frequency through the first and second ports of said circulator device to said first converter,
   - means for applying a modulating signal of a second frequency containing the signal intelligence to said first converter in a manner to cause said first converter to modulate said carrier and produce a third signal composed of modulated sidebands having frequencies spaced on either side of said first frequency by said second frequency,
   - first and second output terminals, means coupled to said first converter through said second port and a third port of said circulator device and responsive to said third signal for applying to said first output terminal a selected one of said sidebands, and a second non-linear frequency converter coupled between said first converter and said second output terminal and responsive to said carrier signal and said third signal for producing at said second output terminal a fourth difference frequency signal of a frequency equal to said second frequency.

3. An arrangement for monitoring the performance of a radio frequency transmitter comprising, in combination, a multiport circulator device arranged to pass signal energy incident on one of said ports only to the next successive one of said ports, a non-linear voltage-sensitive capacitance diode, means for applying a carrier signal of a first frequency through the first and second ports of said circulator device to said capacitance diode, means for applying a modulating signal of a second frequency along with a direct current reverse bias voltage to said capacitance diode in a manner to cause said capacitance diode to change capacitance and thereby modulate said first frequency to produce a third signal composed of modulated sidebands having frequencies spaced on either side of said first frequency by said second frequency, means coupled to said first converter through said second and third ports of said circulator device and responsive to said third signal for producing a modulated output signal having the frequency of one of said sidebands, a non-linear resistance diode, and means coupled between said capacitance diode and said resistance diode for applying a portion of said carrier signal and of said third signal to said diode in a manner to cause said resistance diode to change resistance and mix said carrier signal and said third signal to produce a second difference frequency output signal of a frequency equal to said second frequency.

4. An arrangement for monitoring the performance of a radio frequency transmitter comprising, in combination, a source of a carrier signal of a first frequency, a four-port ferrite circulator of the type arranged to pass signal energy incident on one of said ports only to the next successive one of said ports, a first connecting means for applying said carrier signal from said source to a first one of said ports of said circulator, a first non-linear frequency converter, a second connecting means for applying said carrier signal from a second port of said circulator at which said carrier signal appears to said converter, a source of signal intelligence to be transmitted, means responsive to said intelligence signal source for producing a frequency modulated signal of a second frequency, means for applying said frequency modulated signal to said converter in a manner to cause said converter to produce a third signal composed of frequency modulated sidebands spaced on either side of said first frequency by said second frequency with said third signal being applied back over said second connecting means to said second port, filtering means connected to a third port of said circulator at which said third signal appears and responsive to said third signal for producing a frequency modulated output signal having the selected frequency of one of said sidebands, a matched terminating resistor connected to the fourth port of said circulator and arranged to absorb any signal energy reflected back to said third port from said filtering means, a second non-linear frequency converter, and third connecting means for applying a small amount of said carrier signal and of said third signal from said first converter to said second converter in a manner to cause said second converter to produce a second frequency modulated output signal of said second frequency.

5. In combination, a waveguide, a non-linear frequency mixing device positioned in said waveguide at a point spaced from one end of said waveguide, means for coupling a first signal of a first frequency into the other end of said waveguide so that said first signal travels along said waveguide to said device, means for applying a second signal of a second frequency to said device in a manner to cause said device to modulate said first signal and produce in said waveguide a third signal composed of sidebands having frequencies spaced from said first frequency by said second frequency, and means coupled to said waveguide at a point intermediate said mixing device and said other end of said waveguide and responsive to said first signal and said third signal in said waveguide to produce a fourth signal of said second frequency.

6. An arrangement for monitoring the performance of a radio frequency transmitter comprising, in combination, a waveguide, a non-linear frequency mixing device positioned in said waveguide at a point spaced from one end of said waveguide, means for coupling a carrier signal of a first frequency into the opposite end of said waveguide so that said carrier signal travels along said waveguide to said device, means for applying a modulating signal of a second frequency to said device in a manner to cause said device to modulate said carrier signal and produce in said waveguide a third signal composed of modulated sidebands having frequencies spaced on either side of said first frequency by said second frequency with said third signal travelling back along said waveguide to said opposite end, means coupled to said waveguide at said opposite end and responsive to said third signal for producing a modulated output signal having the frequency of one of said sidebands, and means including a second non-linear frequency mixing device coupled to said waveguide intermediate said mixing device end and said opposite end and responsive to a portion of said carrier signal and said third signal in said waveguide to mix said carrier and said third signal and produce a difference frequency output signal of said second frequency.

7. In combination, a rectangular waveguide, a non-linear frequency mixing device positioned in said waveguide at a point spaced from one end of said waveguide and substantially coupled to the maximum electric field in said waveguide, means for coupling a first signal of a first frequency into the opposite end of said waveguide so that said first signal travels along said waveguide to said device, means for applying a second signal of a second frequency to said device in a manner to cause said device to produce in said waveguide a third signal composed of sidebands having frequencies spaced from said first frequency by said second frequency, a second non-linear frequency mixing device, and means coupled to said waveguide at a point intermediate said first mixing device and said other end for applying a small amount of said carrier signal and of said third signal from said waveguide to said second device in a manner to cause said second device to produce an output signal of said second frequency.

8. An arrangement for monitoring the performance of a radio frequency transmitter comprising, in combination, a waveguide, a multiport circulator device of the type arranged to pass signal energy incident on one of said ports only to the next successive one of said ports, a non-linear voltage-sensitive capacitance diode positioned in said waveguide at a point spaced from one end of said waveguide and substantially coupled to the maximum electric field in said waveguide, means for coupling a carrier signal of a first frequency through the first and second ports of said circulator device and into the opposite end of said waveguide so that said carrier signal travels along said waveguide to said capacitance diode, means for applying a modulating signal of a second frequency to said capacitance diode along with a direct current reverse bias voltage to cause said capacitance diode change capacitance and thereby modulate said carrier signal and to produce in said waveguide a third signal composed of modulated sidebands having frequencies spaced on either side of said first frequency by said second frequency with said third signal travelling back along said waveguide to said opposite end, means coupled to said opposite end of said waveguide through said second and a third port of said circulator device and responsive to said third signal to produce a modulated output signal having the frequency of one of said sidebands, a non-linear resistance diode, and means coupled to said waveguide at a point intermediate said capacitance diode and said opposite end for applying a portion of said carrier signal and said third signal from said waveguide to said resistance diode, said resistance diode being operated in response to said carrier signal and said third signal to change resistance and mix said carrier signal and said third signal and produce a difference frequency output signal of said second frequency.

9. In combination, a rectangular waveguide, a non-linear frequency mixing device located near one end of said waveguide and coupled substantially to the maximum electric field in said waveguide, means for coupling a first signal of a first frequency into the opposite end of said waveguide so that said first signal travels along said waveguide to said device, means for applying a second signal of a second frequency to said device in a manner to cause said device to produce in said waveguide a third signal composed of sidebands having frequencies spaced on either side of said first frequency by said second frequency, a second rectangular waveguide, a second non-linear frequency mixing device located near one end of said second waveguide and coupled substantially to the maximum electric field in said second waveguide, and means intermediate said first mixing device and said opposite end for coupling a small amount of said carrier signal and of said third signal from said first waveguide and into said second waveguide, said second device being operated in response to said carrier signal and said third signal in said second waveguide to produce an output signal of said second frequency.

10. An arrangement for monitoring the performance of a radio frequency transmitter comprising, in combination, a multiport circulator device of the type arranged to pass signal energy incident on one of said ports only to the next successive one of said ports, a rectangular waveguide, a non-linear voltage-sensitive capacitance diode positioned near one end of said waveguide and coupled substantially to the maximum electric field in said waveguide, means for coupling a first signal of a first frequency through the first and second ports of said circulator device and into the opposite end of said waveguide so that said first signal travels along said waveguide to said diode, means for applying a modulating signal of a second frequency along with a direct current reverse bias voltage to said diode to cause said diode to change capacitance and modulate said first signal and produce in said waveguide a third signal composed of modulated sideband frequencies spaced on either side of said first frequency by said second frequency and which travels back along said waveguide to said opposite end, means coupled to said opposite end of said waveguide through said second and a third port of said circulator device and responsive to said third signal for producing a modulated output signal corresponding to only one of said sidebands, a second rectangular waveguide, a non-linear resistance diode positioned in said second waveguide and coupled substantially to the maximum electric field in said second waveguide, and means intermediate said capacitance diode and said opposite end for loosely coupling a small amount of said carrier signal and of said third signal from said first waveguide to said second waveguide, said resistance diode being operated in response to said carrier signal and said third signal in said second waveguide to change resistance and mix said carrier signal and said third signal and produce a difference frequency output signal of said second frequency.

11. An arrangement for monitoring the performance of a radio frequency transmitter as claimed in claim 10, and wherein, said loose coupling means comprises a coupling screw extending through said second waveguide and into said first waveguide at a point intermediate said capacitance diode and said opposite end of said first waveguide, said screw being positioned so as to couple to the maximum electric fields in said first and second waveguides.

12. An arrangement for monitoring the performance of a radio frequency transmitter comprising, in combination, a source of a carrier signal of a first frequency, a four-port ferrite circulator of the type arranged to pass signal energy incident on one of said ports only to the next successive one of said ports, means for applying said carrier signal from said source to a first one of said ports of said circulator, a rectangular waveguide, a first non-linear frequency converting device positioned in said waveguide at a point spaced from one end of said waveguide, second means for coupling said carrier signal from a second port of said circulator at which said carrier signal appears into the opposite end of said waveguide so that said carrier signal travels down said waveguide to said device, a second source of signal intelligence to be transmitted, a modulator coupled to said second source and arranged to produce a third signal of a second frequency and modulated by said signal intelligence, third means for applying said third signal from said modulator to said device to cause said device to produce a fourth signal in said waveguide composed of modulated sidebands of frequencies spaced from said first frequency by said second frequency with said third signal travelling back along said waveguide and coupled to said second port of said circulator by said second means, filtering means connected to a third port of said circulator at which said fourth signal appears and responsive to said fourth signal to produce a modulated output signal having the selected frequency of only one of said sidebands, a matched terminating resistor connected to the fourth port of said circulator and operated to absorb any signal energy reflected back to said third port from said filtering means, a second rectangular waveguide, a second non-linear frequency converting device positioned in said second waveguide at a point spaced near one end of said second waveguide, and fourth intermediate said first frequency converting device and said opposite end means for loosely coupling a portion of said carrier signal and of said fourth signal from said first waveguide into said second waveguide at a point spaced from the opposite end of said second waveguide, said second device being operated in response to said carrier signal and said fourth signal in said second waveguide to prdouce a difference frequency output signal of said second frequency.

13. An arrangement for monitoring the performance of a radio frequency transmitter as claimed in claim 12, and including, said first and second waveguides each being formed of four walls and enclosed at said ends, said second waveguide being joined at one wall at said opposite end of said second waveguide to a wall of said first waveguide at a point intermediate said first frequency converting device and said opposite end of said first waveguide with the longitudinal axis of said second waveguide extending at substantially right angles to the longitudinal axis of said first waveguide, said adjoining walls of said first and second waveguides having an aperture cut therethrough, and an adjustable coupling screw arranged to extend through said second waveguide and said aperture into said first waveguide with said screw being positioned so as to couple to the maximum electric fields in said first and second waveguides.

14. An arrangement for monitoring the performance of a radio frequency carrier comprising, in combination, a source of a carrier signal of a first frequency, a four-port ferrite circulator of the type which transmits signal energy incident on one port to only the next successive port, first means for applying said carrier signal from said source to one of said ports of said circulator, a rectangular waveguide formed of four walls and enclosed at its ends, a non-linear voltage-sensitive capacitance diode positioned at a point in said waveguide spaced from one end of said waveguide with said diode being substantially coupled to the maximum electric field in said waveguide, second means for coupling said carrier signal from a second port of said circulator at which said carrier signal appears and into said waveguide at a point spaced from the opposite end of said waveguide so that said carrier signal travels along said waveguide to said diode, a second source of signal intelligence to be transmitted, a frequency modulator coupled to said second source for producing a third signal frequency modulated by said signal intelligence and of a second frequency, third means for applying said third signal along with a direct current reverse bias voltage to said diode to cause said diode to produce in said waveguide a fourth signal composed of frequency modulated sidebands of frequencies spaced on either side of said first frequency by said second frequency, said fourth signal being produced in a manner to cause said fourth signal to travel back along said waveguide to said opposite end of said waveguide and to be coupled from said waveguide to said second port of said circulator by said second means, a filter circuit connected to a third port of said circulator at which said fourth signal appears and responsive to said fourth signal to provide a frequency modulated output signal having the frequency of only one of said sidebands, a matched terminating resistor connected to the fourth port of said circulator and arranged to absorb any signal energy reflected back to said third port from said filter circuit, a second rectangular waveguide formed of four walls and enclosed at its ends, a wall of said second waveguide at one end of said second waveguide being joined to one wall of said first waveguide at a point intermediate said capacitance diode and said opposite end of said first waveguide so that the opposite end of said second waveguide extends away from said first waveguide, said adjoining walls of said first and second waveguides having an aperture cut therethrough, an adjustable coupling screw mounted on said second waveguide near said one end of said second waveguide and arranged to extend through said second waveguide and said aperture into said first waveguide so that said screw serves to couple a small amount of said carrier signal and said fourth signal from said first waveguide and into said second waveguide, and a non-linear resistance diode positioned in said second waveguide at a point spaced from said opposite end of said second waveguide and substantially coupled to the maximum electric field in said second waveguide, said resistance diode being responsive to said carrier signal and said fourth signal in said second waveguide to produce a second frequency modulated output signal of said second frequency.

15. An arrangement for monitoring the performance of a radio frequency transmitter as claimed in claim 14, and including, a plurality of adjustable tuning screws positioned on said one wall of said first waveguide between said capacitance diode of said first waveguide and said second waveguide for matching said capacitance diode to said first waveguide so as to maximize the power transferred at said one sideband by said capacitance diode, and a further adjustable tuning screw positioned on a wall of said second waveguide for matching said resistance diode to said second waveguide.

References Cited by the Examiner

UNITED STATES PATENTS

| | | | |
|---|---|---|---|
| 2,635,183 | 4/1953 | Smith | 332—39 X |
| 2,735,001 | 2/1956 | Witters | 325—435 |
| 2,769,960 | 11/1956 | Mumford | 332—54 |
| 2,770,729 | 11/1956 | Dicke | 331—9 |
| 2,827,627 | 3/1958 | Arams | 325—435 |
| 2,863,042 | 12/1958 | Sanders et al. | 325—24 |
| 3,001,143 | 9/1961 | Bruck | 325—485 X |
| 3,063,011 | 11/1962 | Sproul et al. | 325—449 |
| 3,136,950 | 6/1964 | Mackey | 333—1.1 |

DAVID G. REDINBAUGH, *Primary Examiner.*

B. V. SAFOUREK, *Assistant Examiner.*